July 21, 1942.  A. A. SCARLETT  2,290,252
ADJUSTABLE HITCH DEVICE
Filed Nov. 23, 1940  2 Sheets-Sheet 1

Inventor
Arthur A. Scarlett
By Paul O. Pippel
Atty.

July 21, 1942.  A. A. SCARLETT  2,290,252
ADJUSTABLE HITCH DEVICE
Filed Nov. 23, 1940  2 Sheets-Sheet 2
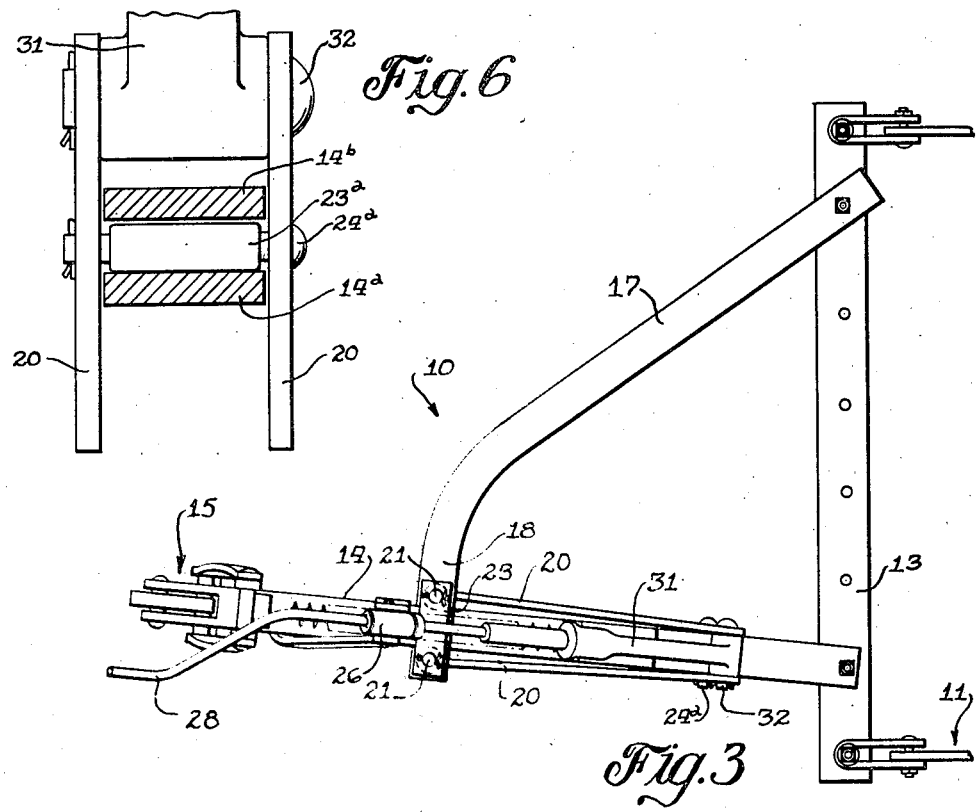
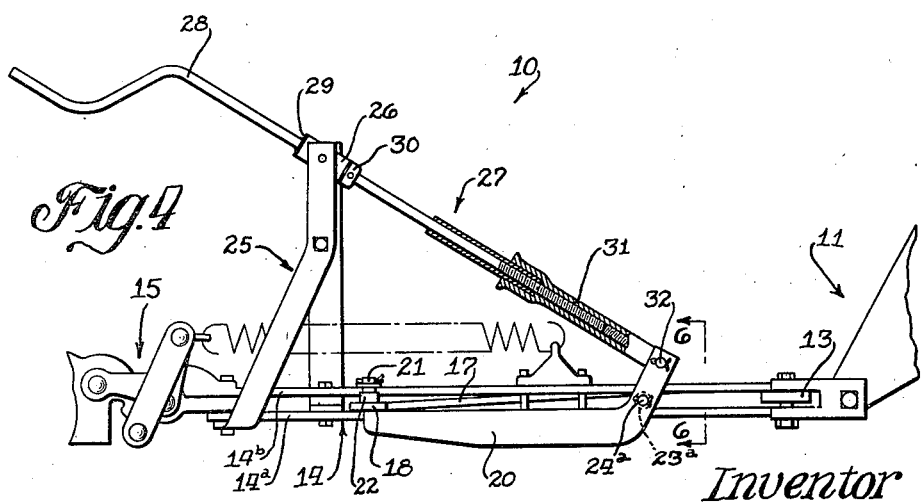
Inventor
Arthur A. Scarlett
By Paul O. Pippel
Atty.

Patented July 21, 1942

2,290,252

UNITED STATES PATENT OFFICE 2,290,252

ADJUSTABLE HITCH DEVICE

Arthur A. Scarlett, Hamilton, Ontario, Canada, assignor, by mesne assignments, to International Harvester Company, Chicago, Ill., a corporation of New Jersey Application November 23, 1940, Serial No. 366,902

2 Claims. (Cl. 280—33.12)

This invention relates to an adjustable hitch device. More specifically it relates to hitch devices of the type which can be adjusted laterally.

It is desirable when hitching an implement structure to a tractor to be able to adjust the hitch point. Many hitch devices of this type have been provided but they are not satisfactory since they are hard to adjust, and the parts of the hitch become worn during use and allow the hitch point to shift freely.

It is, therefore, an object of the present invention to provide an adjustable hitch device which is easy to adjust.

Another object of the invention is to eliminate friction between the adjustable parts of the hitch.

Another object of the invention is to provide means for positively holding the hitch in its adjusted position.

Other objects and advantages of the present invention will be apparent to those skilled in the art after a careful consideration of the following detailed description of the preferred structural embodiment, taken in conjunction with the accompanying drawings, wherein such structural embodiment is illustrated, and in which:

Figure 3 is a plan view of the hitch shown in one of its adjusted positions;

Figure 4 is a side view of the hitch shown in one of its adjusted positions;

Figure 6 is a sectional view taken along the line 6—6 of Figure 4.

Figure 1:
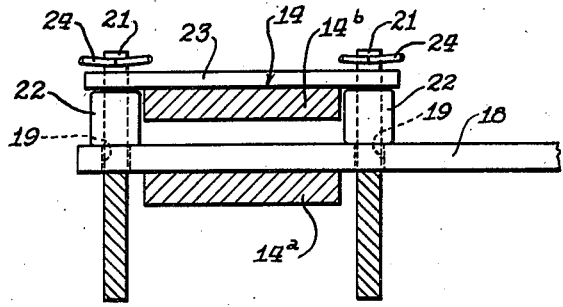
Figure 1 is a plan view of the novel hitch device.
Figure 5:
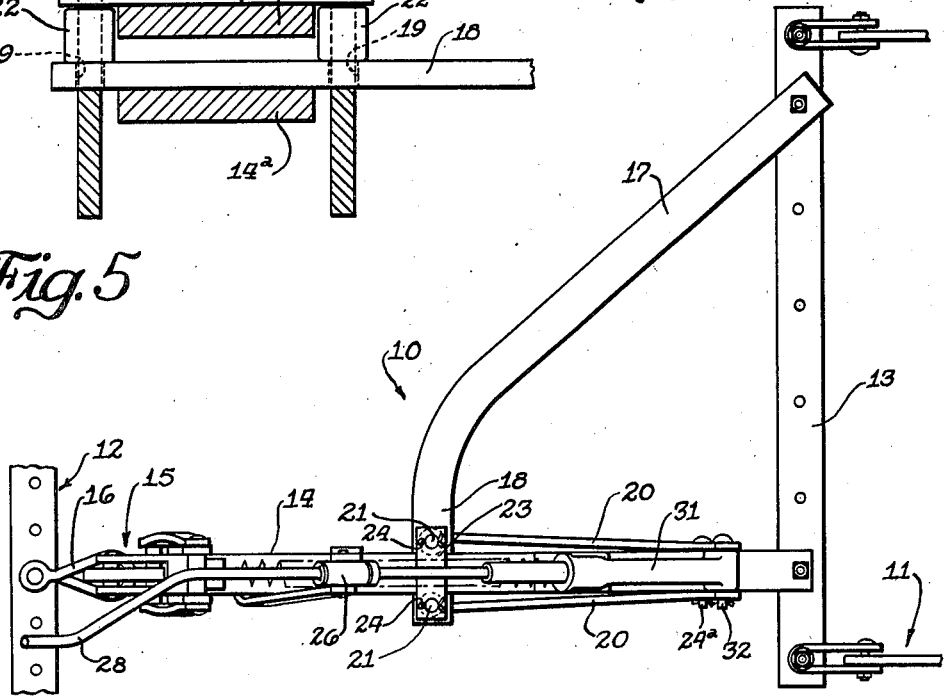
Figure 5 is a sectional view taken along the line 5—5 of Figure 2.

Referring now to Figure 1 of the drawings, the hitch device 10 is adapted to be connected to the frame of an implement structure 11 and to the draw-bar 12 provided on a conventional type tractor. At the front of the implement structure 11 is connected a transverse bar 13 to which is pivotally connected a longitudinally disposed draft member 14 which consists of a pair of bars 14a and 14b. At the front end of the draft member 14 a releasable hitch device 15 is secured between the bars 14a and 14b so as to hold the bars in spaced relation and which is connected to a clevis 16 secured on the tractor drawbar 12. Since the releasable hitch device is old and well known to those skilled in the art the details thereof will not be described, in fact any suitable type of hitch connection could be used in place of the releasable hitch.

A brace member 17 is also pivotally connected to the transverse bar 13 at a point spaced from the pivotal connection of the draft member 14, and has a bent end portion 18 which extends between the bars 14a and 14b of the draft member 14. A pair of openings 19 are provided in the end portion 18 at each side of the draft member 14. A pair of links 20, each having a bent end portion 21, is inserted in each of the openings 19 at each side of the draft member 14. A roller 22 is provided on each of the portions 21 and a part 23 having a pair of openings therein is inserted over the portions 21 of the links 20. Cotter pins 24 inserted in suitable openings provided in the portions 21 hold the links 20, the rollers 22, and the part 23 on the end of the brace member 17.

Figure 2:
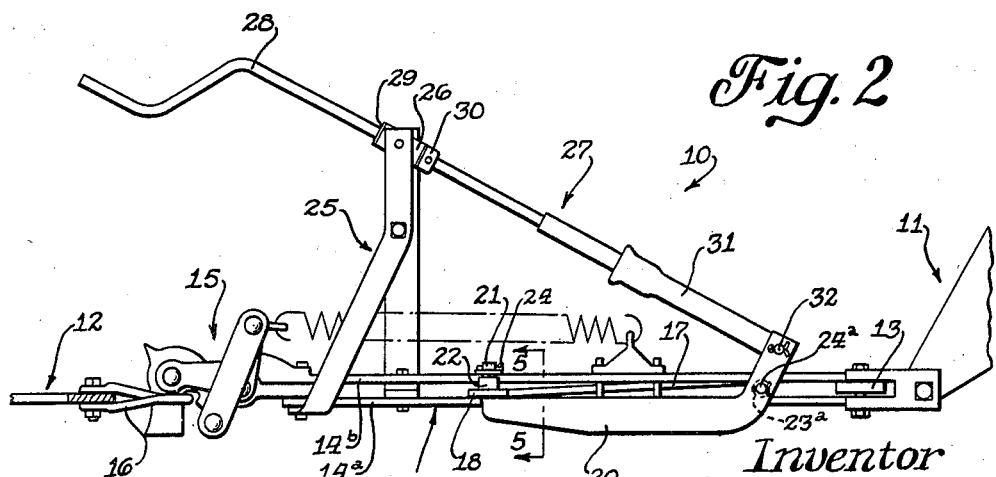
Figure 2 is a side view of the novel hitch device.

As shown in Figure 2 the links 20 extend rearwardly along the sides of the draft member 14, and the rear ends thereof are bent upwardly. As shown in Figures 2 and 6, a roller 23a is provided between the bars 14a and 14b and journaled on a pin 24a which is inserted in alined openings provided in the links 20.

On the front portion of the draft hitch 14 is secured a support 25 at the upper end of which is pivotally mounted a trunnion 26 in which is journaled an adjusting means in the form of a crank screw 27. The crank screw 27 comprises a crank 28 which is held against axial movement with respect to the trunnion 26 by means of a flange 29 and a collar 30 secured on the crank 28. The end of the crank 28 is provided with threads and is turned into a threaded member 31 which is connected to the ends of the links 20 by means of a pin 32. The lead of the threads on the crank and in the threaded members is such that the crank and the member can be quickly moved with respect to one another.

Referring to Figure 1, the draft bar 14 of the hitch is shown in a position perpendicular to the transverse bar 13, and is held in this position by means of the brace member 17 which is connected to the adjusting means on the draft member 14. The draft member 14 may be easily adjusted laterally by turning the crank 28.

On turning the crank 28 in a clockwise or counterclockwise direction, the links 20 which are connected to the crank 28 through the threaded member 31 are moved fore and aft along the draft member 13. The roller 23a rolls between the bars 14a and 14b and the rollers 22 roll along the sides of the bar 14b. On forward movement of the links 20 the draft member 14 is moved about its pivotal connection to the right and on rearward movement of the links 20 the draft member is moved about its pivotal connection to the left. The links 20 are held in their adjusted position by the crank screw 21. The angular position of the brace member 17 is also maintained by virtue of its connection to the links 20, and the draft member 14 is held against lateral movement by the rollers 22 on the brace member 17.

From the foregoing description it is obvious that a novel hitch device has been provided. The hitch can be quickly adjusted and friction between the adjustable parts is eliminated by the use of rollers.

It is the intention to limit the invention only within the terms of the appended claims.

What is claimed is:

1. A hitch device comprising a draft member pivotally mounted on an implement structure, a brace member pivotally mounted on the implement structure at a point spaced from the pivotal mounting of the draft member and extending across the draft member, rollers mounted on the brace member and associated with the draft member, links connected to the brace member and extending along the sides of the draft member, a roller mounted between said links and associated with the draft member, and a crank screw mounted on the draft member and operatively associated with the links for adjusting the brace member to effect adjustment of the draft member.

2. A hitch device comprising a draft member pivotally mounted on an implement structure and adapted to move in a horizontal plane, a brace member pivotally mounted on the implement structure at a point spaced from the pivotal mounting of the draft member and adapted to move in a horizontal plane, rollers mounted at the end of the brace member and associated with the draft member, links connected to the brace member and extending along the sides of the draft member, a roller mounted between said links and associated with the draft member, and a crank and screw mounted on the draft member and operatively connected to said links for adjusting the brace member to effect lateral adjustment of the draft member.

ARTHUR A. SCARLETT.